(12) United States Patent  (10) Patent No.: US 8,967,454 B2
Olsen  (45) Date of Patent: Mar. 3, 2015

(54) ENVELOPES AND FOLDERS WITH DIGITAL MEDIA STORAGE

(71) Applicant: Jeffrey N Olsen, Wilsonville, OR (US)

(72) Inventor: Jeffrey N Olsen, Wilsonville, OR (US)

( * ) Notice: Subject to any disclaimer, the term of this patent is extended or adjusted under 35 U.S.C. 154(b) by 0 days.

(21) Appl. No.: 14/045,608

(22) Filed: Oct. 3, 2013

(65) Prior Publication Data

US 2014/0097108 A1   Apr. 10, 2014

Related U.S. Application Data

(60) Provisional application No. 61/710,555, filed on Oct. 5, 2012, provisional application No. 61/735,743, filed on Dec. 11, 2012, provisional application No. 61/857,090, filed on Jul. 22, 2013, provisional application No. 61/864,923, filed on Aug. 12, 2013.

(51) Int. Cl.
| | |
|---|---|
| *B65D 27/08* | (2006.01) |
| *B65D 27/22* | (2006.01) |
| *B65D 85/57* | (2006.01) |
| *B65D 85/30* | (2006.01) |
| *G11B 23/02* | (2006.01) |
| *B42D 15/04* | (2006.01) |
| *B65D 27/00* | (2006.01) |
| *G11B 33/04* | (2006.01) |

(52) U.S. Cl.
CPC .............. *G11B 23/02* (2013.01); *B42D 15/045* (2013.01); *B65D 27/00* (2013.01); *G11B 33/0494* (2013.01)
USPC .......... 229/72; 229/84; 206/307.1; 206/308.1

(58) Field of Classification Search
USPC ................... 229/72, 82, 84; 206/307.1, 308.1
See application file for complete search history.

(56) References Cited

U.S. PATENT DOCUMENTS

| | | | | |
|---|---|---|---|---|
| 5,775,494 | A | 7/1998 | Taplin | |
| 5,950,401 | A | 9/1999 | Blohm et al. | |
| 6,045,034 | A * | 4/2000 | Roccaforte et al. | 229/67.1 |
| 6,288,996 | B1 | 9/2001 | Siegel | |
| 6,640,473 | B1 | 11/2003 | Shenk | |
| 6,648,136 | B2 * | 11/2003 | Koehn | 206/308.1 |
| 6,652,178 | B2 * | 11/2003 | Walton | 402/79 |
| 6,666,378 | B2 | 12/2003 | Davila et al. | |
| 6,681,928 | B1 * | 1/2004 | Siek et al. | 206/308.1 |
| 6,820,799 | B2 | 11/2004 | Makofsky et al. | |
| 6,845,864 | B2 | 1/2005 | Taw et al. | |
| 6,851,600 | B1 * | 2/2005 | Fus, Sr. | 229/72 |
| 6,951,279 | B2 | 10/2005 | Hodess et al. | |

(Continued)

FOREIGN PATENT DOCUMENTS

| | | |
|---|---|---|
| FR | 2916125 | 11/2008 |
| WO | 2010107556 | 9/2010 |

*Primary Examiner* — Jes F Pascua
(74) *Attorney, Agent, or Firm* — Kolisch Hartwell, PC

(57) ABSTRACT

Packaging systems, such as envelopes and folders, with digital media storage are disclosed. In some embodiments, an envelope may include a unitary planar material folded along first and second transverse folds forming a first end panel, a second end panel, and a middle panel disposed between the first end panel and the second end panel, along the second transverse fold to form a closure for the document receptacle, and a lateral projection on one of the first and second end panels folded along a longitudinal fold onto another portion of the one of the first and second end panels and affixed along an edge of the lateral projection opposite the longitudinal fold to the another portion of the one of the first and second end panels to form a pocket between the lateral projection and the another portion of the one of the first and second end panels.

18 Claims, 7 Drawing Sheets

(56) References Cited

U.S. PATENT DOCUMENTS

| | | |
|---|---|---|
| 7,556,148 B2 | 7/2009 | Skarin |
| 7,857,196 B1 * | 12/2010 | Gorman ............... 229/82 |
| 8,249,919 B2 | 8/2012 | Montague |
| 8,499,932 B2 * | 8/2013 | Hicks et al. ............... 206/312 |
| 2003/0201312 A1 * | 10/2003 | Lee ............... 229/67.3 |
| 2006/0237337 A1 * | 10/2006 | Irie et al. ............... 206/308.1 |

* cited by examiner

ENVELOPES AND FOLDERS WITH DIGITAL MEDIA STORAGE

CROSS-REFERENCE TO RELATED APPLICATIONS

This application claims priority to U.S. Provisional Patent Application Ser. No. 61/710,555, which was filed on Oct. 5, 2012 and entitled "Folder With Digital Media Storage"; U.S. Provisional Patent Application Ser. No. 61/735,743, which was filed on Dec. 11, 2012 and entitled "Folder With Digital Media Storage"; U.S. Provisional Patent Application Ser. No. 61/857,090, which was filed on Jul. 22, 2013 and entitled "Folder With Digital Media Storage"; and U.S. Provisional Patent Application Ser. No. 61/864,923, which was filed on Aug. 12, 2013 and entitled "Folder With Digital Media Storage." The complete disclosures of the above applications are hereby incorporated by reference for all purposes.

FIELD OF THE DISCLOSURE

This disclosure relates to folders and envelopes with digital media storage. More particularly, the disclosure relates to systems and methods for packaging and presenting digital media, such as a USB thumb drive and a CD-ROM or DVD, in direct connection with marketing and advertising materials.

BACKGROUND OF THE DISCLOSURE

Packaging systems, such as packages, folders, and envelopes, are used to contain one or more items for a variety of purposes. For example, packaging systems may be used to transport one or more items, such as via mail, courier, delivery service, etc. The items may be of different types, such as documents, digital media (such as CDs, DVDs, floppy disks, and USBs), photographs, and/or digital cards (such as credit cards, phone cards, and gift cards).

When packaging systems are used to contain items of different types, securing those items within the packaging systems may be important to prevent damaging some of the items. For example, if a packaging system includes a DVD, a stapled document, and a USB, a staple on the document and/or the USB may scratch the DVD's surface if the DVD is not secured within the packaging system and/or physically prevented from coming into contact with the staple and/or the USB. Securing different types of items may, however, be difficult because of differences in size, shape, and/or weight of those items.

One alternative is to use a packaging system that includes multiple packages for each type of item. For example, a first jewel case may be used to contain a DVD, a second jewel case may be used to contain a CD, which are then inserted into an envelope that also contains one or more stapled documents. Alternatively, a single package or envelope that is designed for different types of items may be used.

Additionally, when packaging systems are used to contain documents, the title of those documents typically cannot be read unless the document is removed from the packaging system. One alternative is to include a label that includes the title of the document with the packaging system. Alternatively, a single package or envelope that allows a person to view an upper portion of the document without removing the document from the package may be used. Also, when packaging systems are used to contain business cards, the business cards are typically stapled to enclosed documents or enclosed but not secured within the packaging system, which may lead to the business cards being lost, a reduction in accessibility, or tearing when possibly removing a staple. Alternatively, one or more business card holders may be included in a one piece packaging system so that one or more business cards may be secured in a visible fashion without being stapled or secured with a peripheral device such as a paperclip.

Examples of packaging systems are disclosed in U.S. Pat. Nos. 5,950,401, 5,775,494, 6,288,996, 8,249,919, 6,640,473, 6,666,378, 6,820,799, 6,845,864, 6,951,279, and 7,556,148. The disclosures of these and all other publications referenced herein are incorporated by reference in their entirety for all purposes.

DETAILED DESCRIPTION OF THE DISCLOSURE

Figure 1:
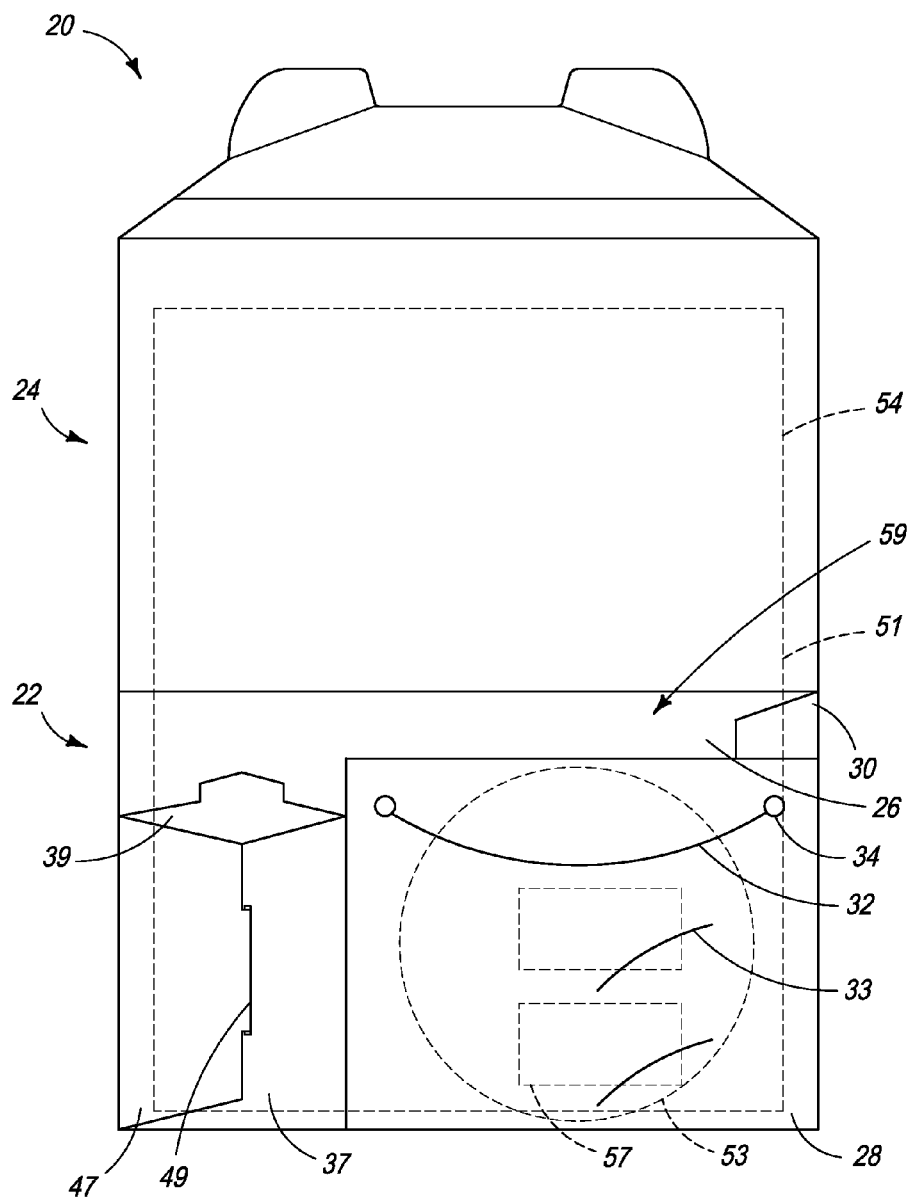
FIG. 1 is a top view of an example of a packaging system shown in an open position.
Figure 2:
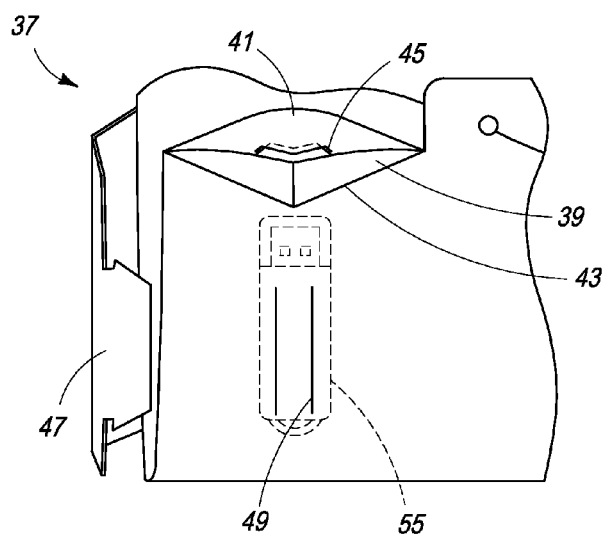
FIG. 2 is a partial view of the packaging system of FIG. 1 showing a pocket configured to hold a USB flash drive.
Figure 3:
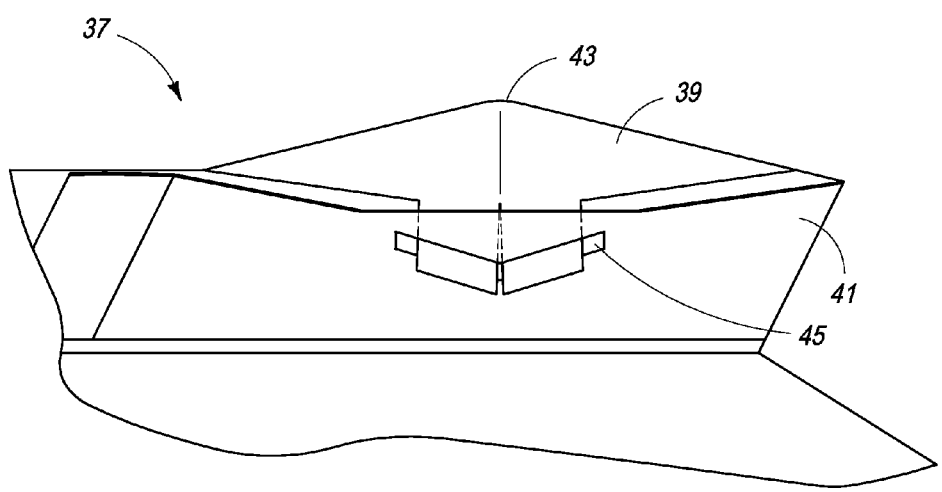
FIG. 3 is a partial view of the packaging system of FIG. 1 showing a closure mechanism for a pocket configured to hold a USB flash drive.
Figure 4:
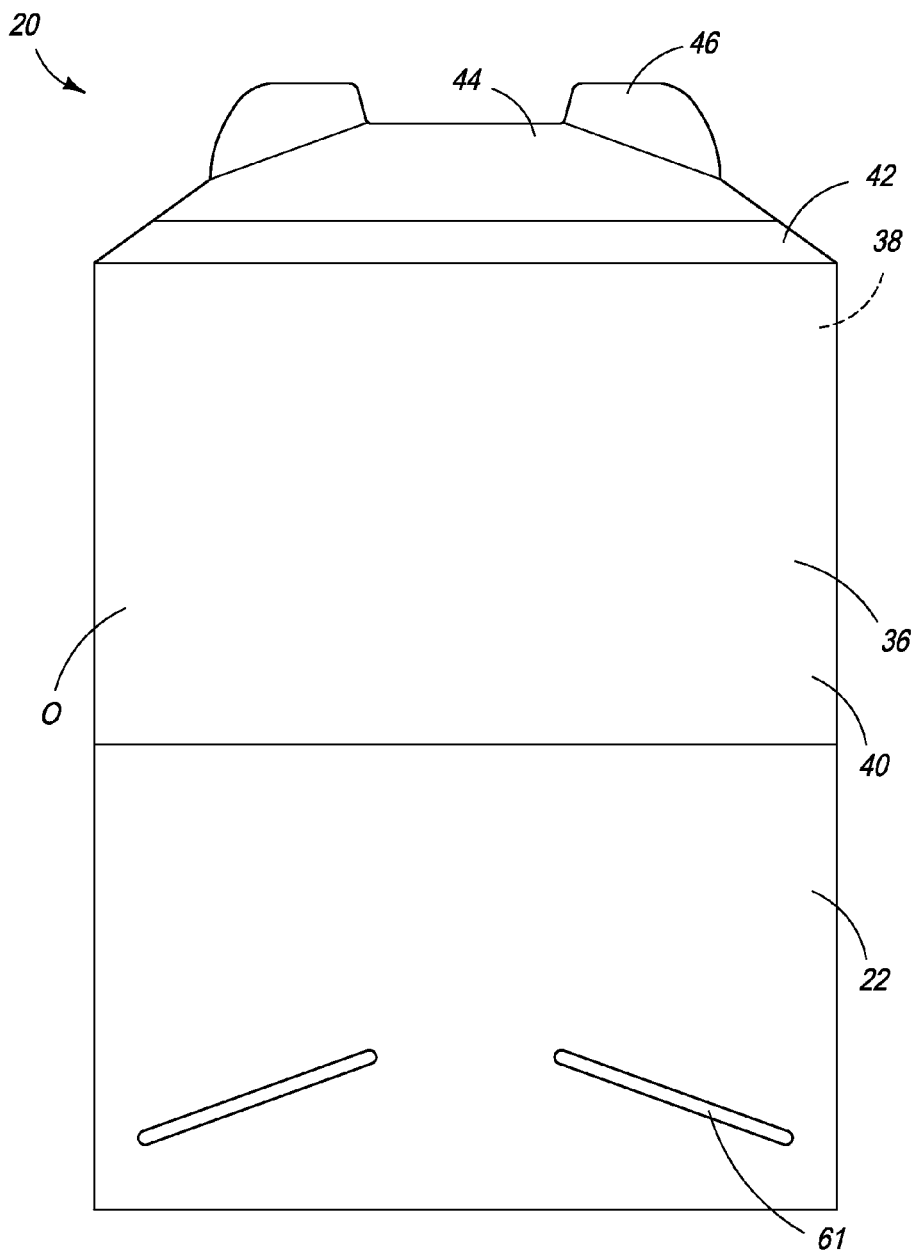
FIG. 4 is a rear view of the packaging system of FIG. 1 shown in an open position.

Examples of a packaging system 20 and packaging system 120 are shown in FIGS. 1-9. Unless otherwise specified, packaging system 20 and packaging system 120 may, but are not required to contain at least one of the structures, components, functionality, and/or variations described, illustrated, and/or incorporated herein.

FIGS. 1-6 show an example of the packaging system 20. The packaging system may be made of one or more suitable materials. For example, the packaging system may be made of paper and/or cardboard. Alternatively, or additionally, the packaging system may include one or more polymer materials, such as one or more vinyl materials. The materials used may be of any suitable thickness. For example, when packaging system 20 is made of paper, the paper may have a thickness of 12 or 14 point C1S, C2S, and/or S1B. The thickness may be selected to adequately protect, for example, digital media.

Packaging system 20 may have any suitable dimensions. For example, the packaging system may be sized to contain documents with dimensions of up to 8½×11 inches. Alternatively, the packaging system may be sized to contain documents with dimensions of up to 8½×14 inches, 11×17 inches, or any suitable dimensions. In some embodiments, the packaging system may be sized to avoid oversized postage. Additionally, the packaging system may include any suitable shape(s). For example, the packaging system may be rectangular, square, triangular, circular, etc. In some embodiments, the packaging system may be sized to avoid additional postage.

Packaging system 20 may include any suitable structure configured to contain one or more different types of items. For example, the packaging system may include a base envelope 22 and a lid 24. The base envelope may include a front panel 26 and a rear panel 28. The front and/or rear panels may be configured to facilitate insertion of items into the base envelope. For example, rear panel 28 may be sized smaller than front panel 26. Front panel 26 may be attached to rear panel 28 via a first side panel 30.

Side panel 30 may be formed with rear panel 28 and that side panel may be attached to front panel 26 via any suitable method(s), such as via one or more suitable adhesives. Alternatively, side panel 30 may be formed with the front panel and that side panel may be attached to the rear panel via any suitable method(s), such as via one or more suitable adhesives. In some embodiments, there may be additional or alternative discrete or continuous panels that are attached to the front and/or rear panels via any suitable method(s). Although base envelope 22 is shown to include side panel 30 between rear panel 28 and front panel 26, the front panel may alternatively be directly attached to the front panel. In some embodiments, the side panel may be configured to allow base envelope 22 to expand.

Additionally, the rear panel may include any suitable structure configured to contain one or more different types of items. For example, rear panel 28 may include at least one slot 32. The slot may be any suitable size to secure any suitable number of items. Additionally, slot 32 may be any suitable shape configured to secure any suitable type(s) of items, such as CDs, DVDs, gift cards, digital cards, etc. For example, the slot may be rectilinear and/or curvilinear. Moreover, slot 32 may include apertures 34 and/or other structure configured to prevent tearing or ripping of the slot. Although rear panel 28 is shown to include a single slot 32, the rear panel may include two or more slots, which may be in any suitable arrangement or orientation.

Moreover, rear panel 28 may include at least one set of opposing slots 33. The opposing slots may be any suitable size to secure any suitable number of items. Additionally, opposing slots 33 may be any suitable shape configured to secure any suitable type(s) of items, such as business cards, CDs, DVDs, gift cards, digital cards, etc. For example, the opposing slots may be rectilinear and/or curvilinear. Moreover, opposing slots 33 may include apertures (not shown) and/or other structure configured to prevent tearing or ripping of the slot. Although rear panel 28 is shown to include two opposing slots 33, the rear panel may include any suitable number of opposing slots or multiple sets of opposing slots, which may be in any suitable arrangement or orientation.

Furthermore, packaging system 20 may include one or more USB locking pocket(s) 37. As shown in FIGS. 1-6 in the example of the packaging system 20, USB locking pocket 37 may be formed from rear panel 28. As shown USB locking pocket 37 may include a locking lid 39 and a panel portion 41 for forming the locking pocket by attaching the panel portion 41 to a back side of rear panel 28. Panel portion 41 may be attached to rear panel 28 via any suitable method(s), such as via one or more suitable adhesives. USB locking pocket 37 may also include folds 43 which may be configured to provide a structured volume inside the locking pocket. USB locking pocket 37 may also include a locking slot 45 for securing locking lid 39. Additionally, USB locking pocket may include a securing slot 49 and packaging system 20 may include a securing flap 47. Securing flap 47 may be inserted into securing slot 49 so as to secure USB locking pocket and rear panel 28 thus forming a document pocket 59. Alternatively, the USB locking pocket may be analogously formed from front panel 26 and the securing flap may be formed from rear panel 28.

Figure 5:
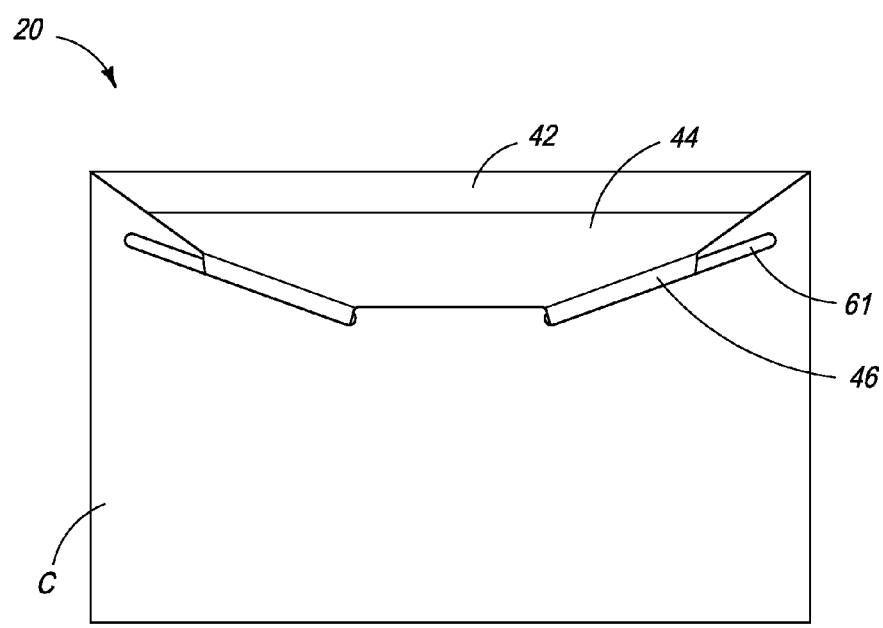
FIG. 5 is a rear view of the packaging system of FIG. 1 shown in a closed position.
Figure 6:
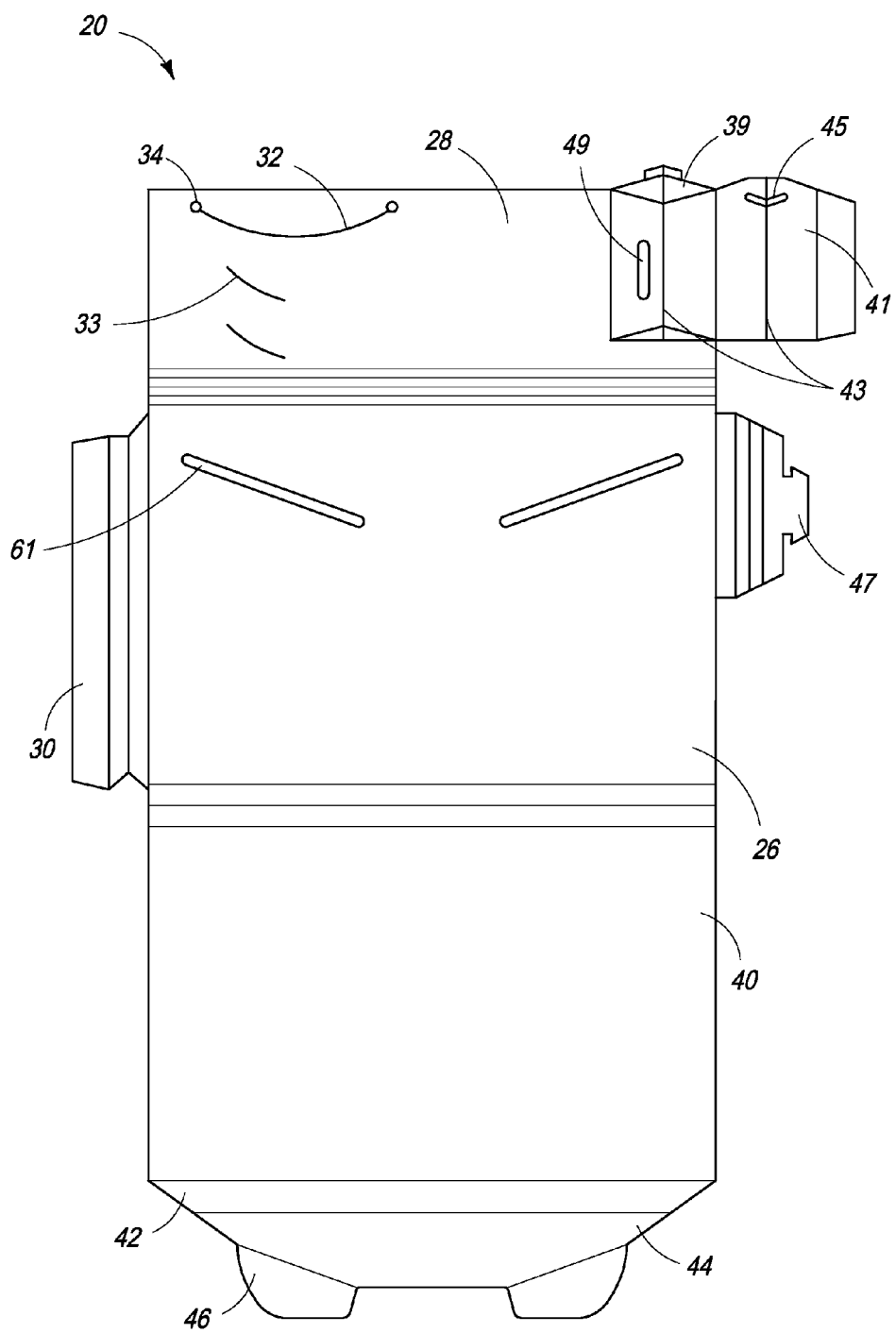
FIG. 6 is a rear view of the packaging system of FIG. 1 shown unfolded.

Lid 24 may include a front portion 36, a rear portion 38, a proximal portion 40, and a lateral portion 42. The proximal portion may be pivotably connected to base envelope 22 such that the lid can move between an open position O in which items can be inserted or removed (as shown in FIG. 1), and a closed position C in which items are secured within the packaging system (as shown in FIG. 5). The lid may include a closure flap 44 configured to secure or attach lateral portion 42 to the base envelope. For example, the closure flap may include at least one tab 46. The closure flap may be secured to the front and/or rear panels of the base envelope. As shown in the example packaging system 20, the closure flap may be secured by inserting tabs 46 into tab slots 61. Additionally or alternatively, the closure flap may include at least one adhesive strip (such as an adhesive strip shown in U.S. Pat. No. 6,820,799). In some embodiments, the closure flap also may include at least one tear strip to facilitate opening of the packaging system. The tear strip may sometimes be referred to as a zip strip. Alternatively, or additionally, base envelope 22 may be configured to receive closure flap 44, such as one or more slots sized to receive the closure flap. The closure flap may be additionally or alternatively secured to the base envelope with any suitable form of packing tape, such as one or more tape dots.

Information, such as advertising information, may be printed on or attached to the lid and/or base envelope. For example, advertising information may be printed on the rear portion of the lid and the rear panel of the envelope.

In use, lid 24 may be moved to the open position and one or more items may be inserted in the base envelope, as shown in FIGS. 1-6. For example, a document, such as document 51, may be inserted into document pocket 59; an item, such as CD 53, may be inserted into slot 32; an item, such as a USB 55, may be inserted into USB locking pocket 37; and an item, such as a business card 57, may be inserted into opposing slots 33. An image of a USB or other suitable item may be printed or attached to USB locking pocket 37 to indicate to the user that a USB or other suitable item is contained or is able to be contained within USB locking pocket 37. An upper portion 54 of the document is visible when lid is in the open position, which may facilitate identification of the document without removing the document from the base envelope. The lid may be moved to the closed position and the closure flap may be attached to and/or tucked into the base envelope. The packaging system may then ready to be transported via any suitable means. Although packaging system 20 is shown to contain document 51, CD 53, USB 55, and business card 57 the packaging system may contain any suitable type(s) of items and/or any suitable number of those items.

It is perfect for your USBs—our NEW Tuck Flap folders feature a pocket for your USB plus a full size pocket to hold any 8½"×11" documents you'd like to include. All while offering ample space to market your company's locations, services, refinance discount schedule and more! Your clients' will love that they are easy to store versus bulky legal size papers.

Advertisement for packaging system 20 may include design and print in beautiful full color, durable 12 pt C2S semi gloss paper stock Tuck-flap closure which may keep it securely closed and easy for your customer to store, one or more locking pockets which may securely hold a USB, a full size pocket may hold 8½"×11" documents, two business card slits may be available and may include the Escrow Officer's card and the Mortgage Company's card which may ensure return business, customizing specifically for your office with photos which may be of an area you service, and/or folding to an overall size of 9"×5¾". Any combinations of the above options may be included and/or omitted.

Packaging system 20 may include two sets of opposing slots that may be configured in such a way as to display at least two business cards. For example, the packaging system may include one or more curved slots 72 that may each display one or more business cards or any other suitable object. Another example of a packaging system may include information (such as advertising information) printed and/or written on one or more of the panels. Other examples of packaging system 20 may include a CD slit and an expansion slit.

Figure 7:
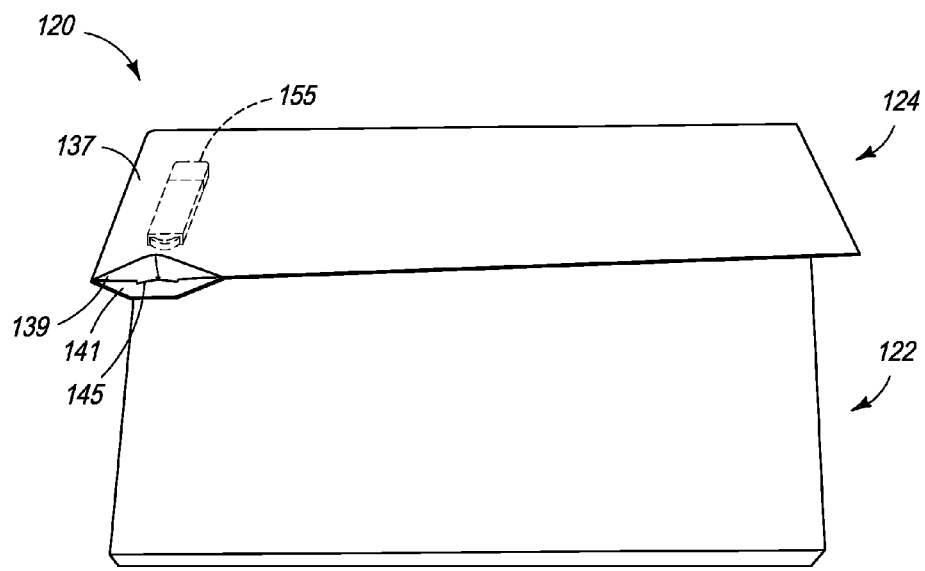
FIG. 7 is a top view of another example of a packaging system shown with the packaging system in a closed position and a pocket configured to hold a USB flash drive in a closed position.
Figure 8:
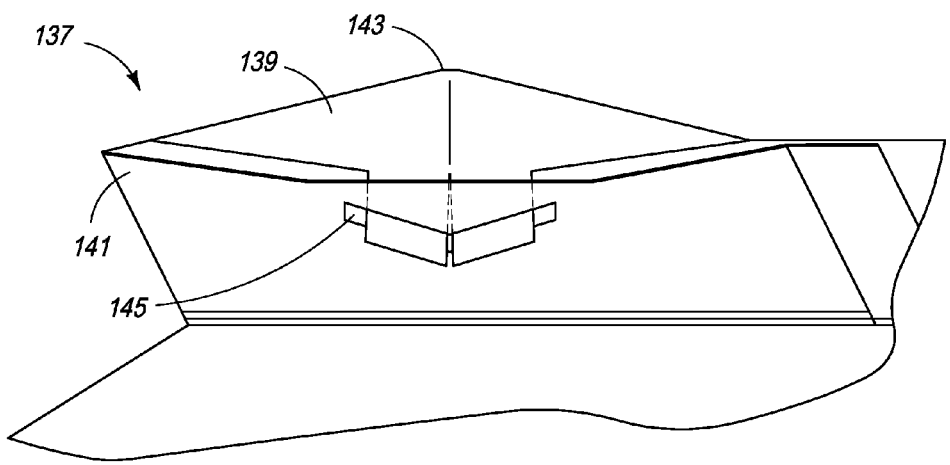
FIG. 8 is a partial view of the packaging system of FIG. 7 showing a closure mechanism for a pocket configured to hold a USB flash drive.
Figure 9:
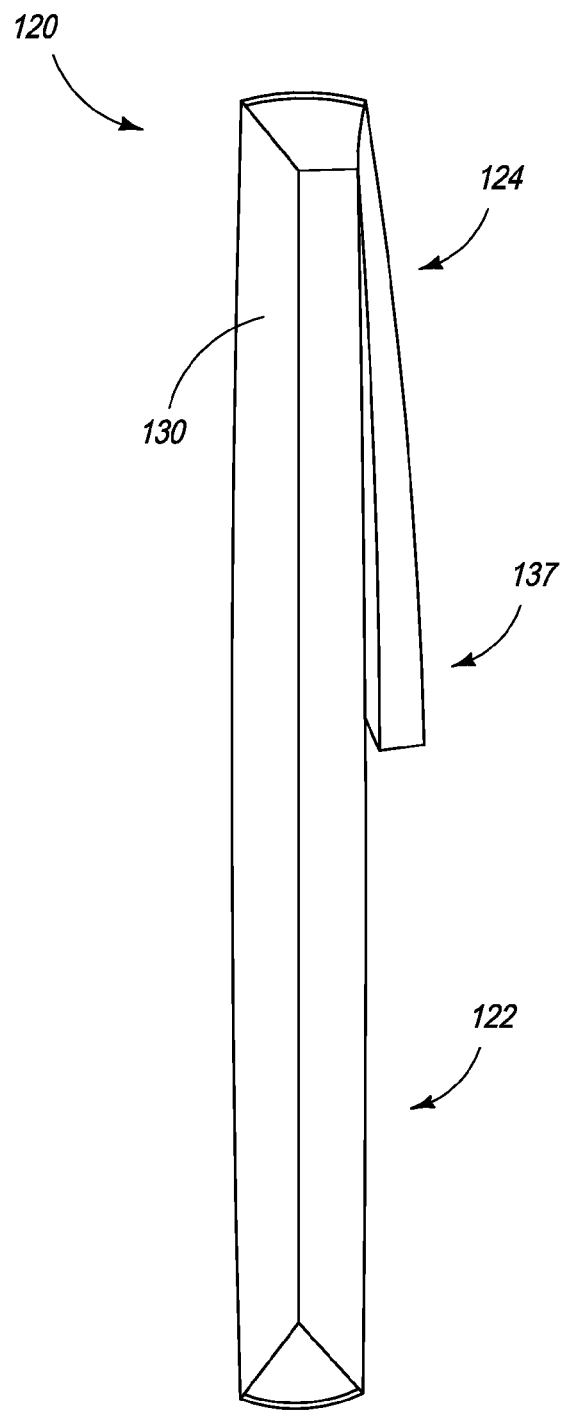
FIG. 9 is a side view of the packaging system of FIG. 7 showing the packaging system in a closed position.

FIGS. 7-9 show packaging system 120 in the form of a portfolio or envelope folder. Packaging system 120 as shown in FIGS. 6-9 include reference numbers that may correspond to similar or identical components as packaging system 20. The portfolio folder includes a base and a closure flap with a USB locking pocket. The USB locking pocket includes a plurality of folds, a locking slot, and one or more locking tabs. The folds may be configured to provide a structured volume inside the locking pocket. The locking tab(s) are configured to be received in the locking slot to secure the USB in the USB locking pocket.

In some embodiments, the portfolio folder may include expansion gussets to allow the portfolio folder to expand to accommodate more items. Additionally, the closure flap, the base, and/or other portions of the portfolio folder may include one or more slots to accommodate one or more items. Moreover, the closure flap, the base, and/or other components of the portfolio folder may include any suitable mechanism to secure the closure flap to the base. Furthermore, the portfolio folder may include one or more components of the other packaging systems described in the present disclosure, such as various slots and/or tabs to hold one or more items.

Although FIGS. 7-9 show a portfolio folder with a single USB locking pocket, the portfolio folder may include two or more USB locking pockets. Moreover, although FIGS. 7-96 show a portfolio folder with a USB locking pocket on one end of the closure flap, the USB locking pocket may be located on the other end of the closure flap or disposed between the ends.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. An envelope, comprising:
   a unitary planar material folded along first and second transverse folds forming a first end panel, a second end panel, and a middle panel disposed between the first end panel and the second end panel,
   the first end panel being folded over the middle panel along the first transverse fold, the middle panel including lateral projections folded along longitudinal folds and affixed to the first end panel to form a document receptacle between the middle panel and the first end panel,
   the second end panel being configured to be folded over the first end panel and the middle panel along the second transverse fold to form a closure for the document receptacle,
   a lateral projection on one of the first and second end panels folded along a longitudinal fold onto another portion of the one of the first and second end panels and affixed along an edge of the lateral projection opposite the longitudinal fold to the another portion of the one of the first and second end panels to form a pocket between the lateral projection and the another portion of the one of the first and second end panels, the pocket having four edges, at least one edge of the four edges being an open edge that is perpendicular to the longitudinal fold,
   the pocket including a flap extending at the open edge from one of (1) the lateral projection and (2) the another portion of the one of the first and second end panels, the flap being distinguishable by a preformed crease on the one of (1) the lateral projection and (2) the another portion of the one of the first and second end panels, the crease deviating inwardly from a hypothetical straight side of the pocket, the flap configured to be folded among a plurality of positions, including a first position in which the flap is substantially coplanar with the another portion of the one of the first and second end panels and the pocket is substantially flat, and a second position in which the flap is folded and positioned substantially perpendicular to the another portion of the one of the first and second end panels,
   the flap, when in the second position, giving the pocket an internal volume in which one or more items may be contained, wherein the flap includes at least one tab, the pocket further including a slit formed on the other of (1) the lateral projection and (2) the another portion of the one of the first and second end panels, the slit positioned to maintain the flap in the second position when the at least one tab is inserted into the slit.

2. The envelope of claim 1, wherein the one of the first and second end panels is the first end panel.

3. The envelope of claim 2, wherein the pocket is formed adjacent to the document receptacle.

4. The envelope of claim 2, wherein the second end panel is approximately the same size as the middle panel.

5. The envelope of claim 4, wherein the second end panel includes a first portion and a second portion distinguished by an additional transverse fold between the first and second portions.

6. The envelope of claim 5, wherein the first portion has substantially the same dimensions as the middle panel and is configured to be folded over the middle panel to cover the document receptacle.

7. The envelope of claim 6, wherein the second portion is folded around the middle panel when the first portion is folded over the middle panel such that the middle panel is disposed between the first and second portions.

8. The envelope of claim 7, wherein the middle panel includes at least one slot and the second portion includes at least one tab configured to be inserted into the at least one slot.

9. The envelope of claim 3, wherein the pocket is configured to hold a USB flash drive.

10. The envelope of claim 9, further including a curvilinear slit configured to receive a compact disc.

11. The envelope of claim 10, wherein the first end panel includes the curvilinear slit.

12. The envelope of claim 9, further including a plurality of slits configured to receive at least one business card.

13. The envelope of claim 12, wherein the first end panel includes the plurality of slits.

14. The envelope of claim 1, wherein the one of the first and second end panels is the second end panel.

15. The envelope of claim 14, wherein the pocket is configured to hold a USB flash drive.

16. The envelope of claim 14, wherein the lateral projections include a plurality of folds configured to provide the document receptacle with an expandable interior volume.

17. An envelope, comprising:
a unitary planar material folded along first and second transverse folds forming a first end panel, a second end panel, and a middle panel disposed between the first end panel and the second end panel,
the first end panel being folded over the middle panel along the first transverse fold, the middle panel including lateral projections folded along longitudinal folds and affixed to the first end panel to form a document receptacle between the middle panel and the first end panel, the first end panel further including a curvilinear slit configured to receive at least one compact disc and a plurality of slits configured to receive at least one business card,
the second end panel being configured to be folded over the first end panel and the middle panel along the second transverse fold to form a closure for the document receptacle,
a lateral projection on the first end panel folded along a longitudinal fold onto another portion of the first end panel and affixed along an edge of the lateral projection opposite the longitudinal fold to the another portion of the first end panel to form a pocket between the lateral projection and the another portion of the first end panel, the pocket having four edges, at least one edge of the four edges being an open edge that is perpendicular to the longitudinal fold, the pocket being formed adjacent to the document receptacle and being configured to hold a USB flash drive,
the pocket including a flap extending at the open edge from the another portion of the one of the first and second end panels, the flap being distinguishable by a preformed crease on the another portion of the first end panel, the crease deviating inwardly from a hypothetical straight side of the pocket, the flap configured to be folded among a plurality of positions, including a first position in which the flap is substantially coplanar with the another portion of the first end panel and the pocket is substantially flat, and a second position in which the flap is folded and positioned substantially perpendicular to the another portion of the first end panel,
the flap, when in the second position, giving the pocket an internal volume in which one or more items may be contained, wherein the flap includes at least one tab, the pocket further including a slit formed on the lateral projection, the slit positioned to maintain the flap in the second position when the at least one tab is inserted into the slit.

18. An envelope, comprising:
a unitary planar material folded along first and second transverse folds forming a first end panel, a second end panel, and a middle panel disposed between the first end panel and the second end panel,
the first end panel being folded over the middle panel along the first transverse fold, the middle panel including lateral projections folded along longitudinal folds and affixed to the first end panel to form a document receptacle between the middle panel and the first end panel,
the second end panel being configured to be folded over the first end panel and the middle panel along the second transverse fold to form a closure for the document receptacle,
a lateral projection on the second end panel folded along a longitudinal fold onto another portion of the second end panel and affixed along an edge of the lateral projection opposite the longitudinal fold to the another portion of the second end panel to form a pocket between the lateral projection and the another portion of the second end panel, the pocket having four edges, at least one edge of the four edges being an open edge that is perpendicular to the longitudinal fold,
the pocket including a flap extending at the open edge from the another portion of the second end panel, the flap being distinguishable by a preformed crease on the another portion of the second end panel, the crease deviating inwardly from a hypothetical straight side of the pocket, the flap configured to be folded among a plurality of positions, including a first position in which the flap is substantially coplanar with the another portion of the second end panels and the pocket is substantially flat, and a second position in which the flap is folded and positioned substantially perpendicular to the another portion of the second end panels,
the flap, when in the second position, giving the pocket an internal volume in which a USB flash drive may be contained, wherein the flap includes at least one tab, the pocket further including a slit formed on the lateral projection, the slit positioned to maintain the flap in the second position when the at least one tab is inserted into the slit, wherein the lateral projections include a plurality of folds configured to provide the document receptacle with an expandable interior volume.

* * * * *